(12) United States Patent
Fung

(10) Patent No.: US 8,949,763 B1
(45) Date of Patent: Feb. 3, 2015

(54) APPARATUS AND METHODS FOR OPTIMIZATION OF INTEGRATED CIRCUITS

(75) Inventor: Ryan Fung, Mississauga (CA)

(73) Assignee: Altera Corporation, San Jose, CA (US)

(*) Notice: Subject to any disclaimer, the term of this patent is extended or adjusted under 35 U.S.C. 154(b) by 903 days.

(21) Appl. No.: 12/242,365

(22) Filed: Sep. 30, 2008

Related U.S. Application Data

(60) Provisional application No. 60/976,972, filed on Oct. 2, 2007.

(51) Int. Cl.
*G06F 17/50* (2006.01)
*G06F 9/455* (2006.01)

(52) U.S. Cl.
USPC ........... 716/132; 716/104; 716/126; 716/128; 716/133; 716/135; 326/37; 326/38; 326/39; 326/41

(58) Field of Classification Search
USPC ......... 716/104, 118–121, 126, 128, 132, 133, 716/135; 326/37–39, 41
See application file for complete search history.

(56) References Cited

U.S. PATENT DOCUMENTS

| | | | | |
|---|---|---|---|---|
| 6,038,386 A | * | 3/2000 | Jain ................................ | 716/113 |
| 7,129,745 B2 | * | 10/2006 | Lewis et al. ..................... | 326/38 |
| 7,463,057 B1 | * | 12/2008 | Rahim et al. .................... | 326/38 |
| 7,467,310 B1 | * | 12/2008 | Mendel .......................... | 713/300 |

OTHER PUBLICATIONS

Anderson et al., Low-Power Programmable Routing Circuitry for FPGA, 2004, IEEE, pp. 602-609.*
Gayasen et al., Reducing Leakage Energy in FPGA Using Region-Constraint Placement, 2004, AMC, pp. 51-58.*

* cited by examiner

*Primary Examiner* — Nghia Doan
(74) *Attorney, Agent, or Firm* — Law Offices of Maximilian R. Peterson

(57) ABSTRACT

A system for computer-aided design (CAD) of an integrated circuit (IC) uses a computer. The computer is configured to optimize placement, routing, and/or region configuration of the integrated circuit (IC) by maximizing a number of low-power regions in the integrated circuit (IC).

12 Claims, 13 Drawing Sheets

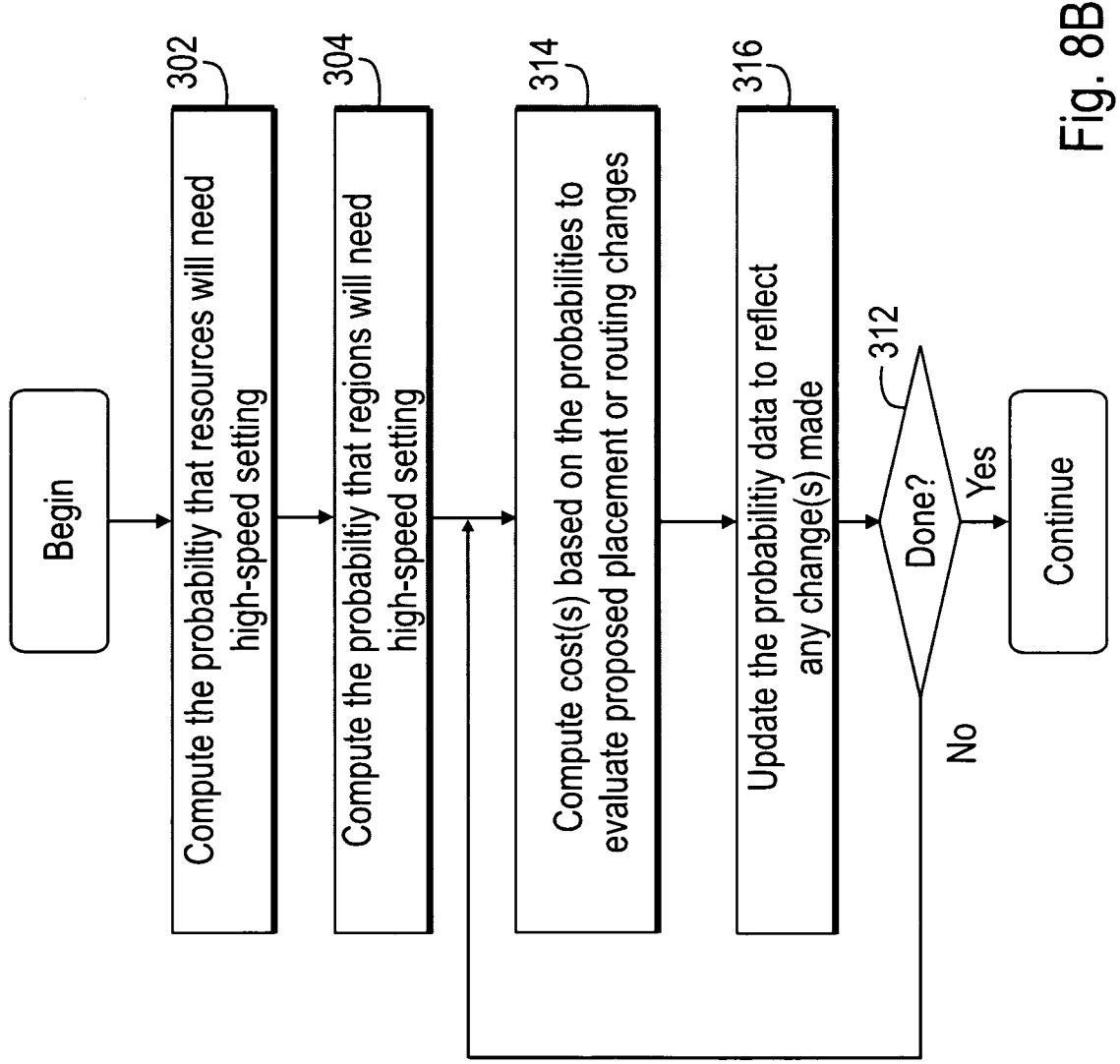

APPARATUS AND METHODS FOR OPTIMIZATION OF INTEGRATED CIRCUITS

CROSS-REFERENCE TO RELATED APPLICATIONS

This patent application claims priority to, and incorporates by reference, U.S. Provisional Patent Application Ser. No. 60/976,972, filed on Oct. 2, 2007, titled "Apparatus and methods for high-speed low-power region optimization."

TECHNICAL FIELD

The disclosed concepts relate generally to optimizing the performance of integrated circuits (ICs), such as programmable logic devices (PLDs). More particularly, disclosed concepts concern optimizing power consumption of ICs, for example, PLDs.

BACKGROUND

Advances in electronics has allowed increased level of integration. The technology for fabrication of ICs has contributed to those advances, and has provided a vehicle for integrating a relatively large number of circuits and functions into an IC. As a result, present-day ICs might contain hundreds of millions of transistors. Consequently, the power consumption, power dissipation, die temperatures and, hence, power density (power dissipation in various circuits or blocks), of ICs has tended to increase. The upward march of the power density might make IC design and implementation impractical or failure-prone.

SUMMARY

The disclosed concepts relate to apparatus and methods for power optimization in electronic circuits, such as programmable logic devices (PLDs). In one exemplary embodiment, a system for computer-aided design (CAD) of an integrated circuit (IC) includes a computer. The computer is configured to optimize synthesis, placement, and/or routing of the IC by maximizing a number of low-power regions in the IC. In another exemplary embodiment, a CAD system for the design of an IC includes a computer. The computer is configured to set each region in a plurality of regions in the IC to operate in one of at least two modes in order to optimize timing and power consumption of the IC. The two modes include a low-power mode of operation and a high-speed mode of operation.

BRIEF DESCRIPTION OF THE DRAWINGS

The appended drawings illustrate only exemplary embodiments and therefore should not be considered as limiting its scope. Persons of ordinary skill in the art who have the benefit of this disclosure appreciate that the disclosed concepts lend themselves to other equally effective embodiments. In the drawings, the same numeral designators used in more than one drawing denote the same, similar, or equivalent functionality, components, or blocks.

FIG. 8B illustrates a simplified flowchart according to another exemplary embodiment for optimizing the number of high-speed regions during placement and routing by monitoring the regions.

DETAILED DESCRIPTION

The disclosed concepts relate to apparatus and methods for power optimization in electronic circuits, such as programmable logic devices (PLDs). One aspect of the disclosed concepts concerns setting attributes of regions or blocks or tiles of a semiconductor chip or IC.

In some logic devices, regions (or tiles) of the chip can be re-configured to operate in lower-power modes. The cost of these modes of operation is that the logic and/or routing may operate more slowly.

Ideally, a computer-aided design (CAD) tool would try to minimize dynamic and/or static power by configuring many regions to low-power mode, leaving the timing critical portions of the design in high-speed mode. The CAD tool should also support power constraints, which will limit the power of the final solution, but may impact the timing performance of the design. It is also desirable that the high-speed low-power tile optimization algorithm execute in reasonable time. Finally, the CAD tool should optimize the placement and routing solution to maximize the number of opportunities for regions to be configured to low-power mode.

As noted above, one may apply the disclosed concepts to a wide variety of ICs, including PLDs. Without a loss of generality, the following paragraphs describe the application of disclosed concepts to PLDs. As persons of ordinary skill in the art who have the benefit of the description of the disclosed concepts understand, however, one may apply the disclosed concepts to other electronic circuits or ICs.

Figure 1:
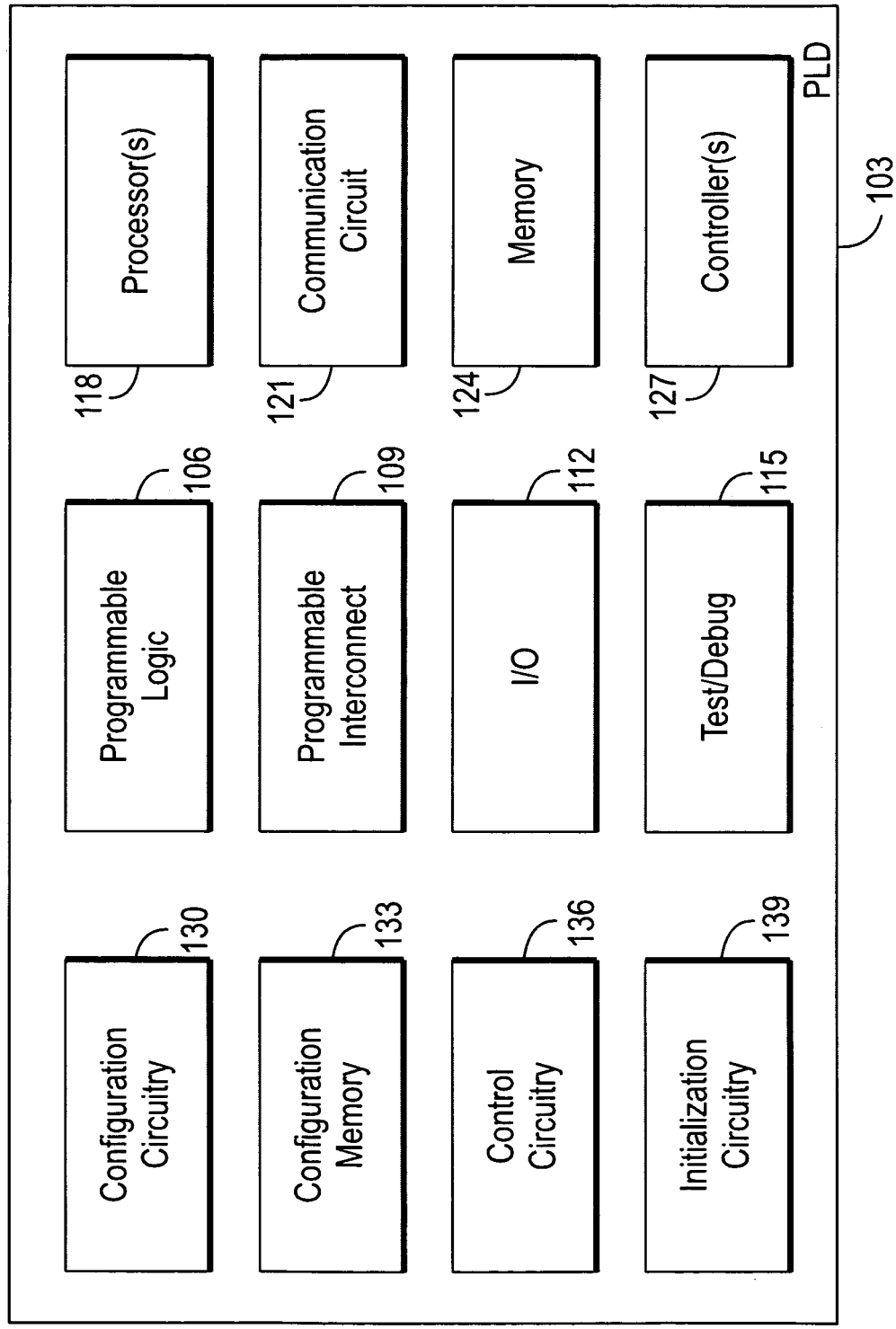
FIG. 1 illustrates a general block diagram of a PLD that may be designed or used via illustrative embodiments.

FIG. 1 depicts a general block diagram of a PLD that may be designed or used via illustrative embodiments. One may use the disclosed concepts in the CAD software that a user may use to program the PLD or for using the PLD, for example, using the PLD's resources to implement a desired circuit or system.

Referring to FIG. 1, PLD 103 includes configuration circuitry 130, configuration memory (CRAM) 133, control circuitry 136, programmable logic 106, programmable interconnect 109, and I/O circuitry 112. In addition, PLD 103 may include test/debug circuitry 115, one or more processors 118, one or more communication circuitry 121, one or more memories 124, one or more controllers 127, and initialization circuit 139, as desired.

Note that the figure shows a simplified block diagram of PLD 103. Thus, PLD 103 may include other blocks and circuitry, as persons of ordinary skill in the art understand. Examples of such circuitry include clock generation and distribution circuits, redundancy circuits, and the like. Furthermore, PLD 103 may include, analog circuitry, other digital circuitry, and/or mixed-mode circuitry, as desired.

Programmable logic 106 includes blocks of configurable or programmable logic circuitry, such as look-up tables (LUTs), product-term logic, multiplexers (MUXs), logic gates, registers, memory, and the like. Programmable interconnect 109 couples to programmable logic 106 and provides configurable interconnects (coupling mechanisms) between various blocks within programmable logic 106 and other circuitry within or outside PLD 103.

Control circuitry 136 controls various operations within PLD 103. Under the supervision of control circuitry 136, PLD configuration circuitry 130 uses configuration data (which it obtains from an external source, such as a storage device, a host, etc.) to program or configure the functionality of PLD 103. Configuration data are typically stored in CRAM 133. The contents of CRAM 133 determine the functionality of various blocks of PLD 103, such as programmable logic 106 and programmable interconnect 109. Initialization circuit 139 may cause the performance of various functions at reset or power-up of PLD 103.

I/O circuitry 112 may constitute a wide variety of I/O devices or circuits, as persons of ordinary skill in the art who have the benefit of the disclosure understand. I/O circuitry 112 may couple to various parts of PLD 103, for example, programmable logic 106 and programmable interconnect 109. I/O circuitry 112 provides a mechanism and circuitry for various blocks within PLD 103 to communicate with external circuitry or devices.

Test/debug circuitry 115 facilitates the testing and troubleshooting of various blocks and circuits within PLD 103. Test/debug circuitry 115 may include a variety of blocks or circuits known to persons of ordinary skill in the art who have the benefit of the disclosure. For example, test/debug circuitry 115 may include circuits for performing tests after PLD 103 powers up or resets, as desired. Test/debug circuitry 115 may also include coding and parity circuits, as desired.

PLD 103 may include one or more processors 118. Processor 118 may couple to other blocks and circuits within PLD 103. Processor 118 may receive data and information from circuits within or external to PLD 103 and process the information in a wide variety of ways, as persons skilled in the art with the benefit of the disclosure in this document appreciate. One or more of processor(s) 118 may constitute a digital signal processor (DSP). DSPs allow performing a wide variety of signal processing tasks, such as compression, decompression, audio processing, video processing, filtering, and the like, as desired.

PLD 103 may also include one or more communication circuits 121. Communication circuit(s) 121 may facilitate data and information exchange between various circuits within PLD 103 and circuits external to PLD 103, as persons of ordinary skill in the art who have the benefit of the disclosure in this document understand.

PLD 103 may further include one or more memories 124 and one or more controller(s) 127. Memory 124 allows the storage of various data and information (such as user-data, intermediate results, calculation results, etc.) within PLD 103. Memory 124 may have a granular or block form, as desired. Controller 127 allows interfacing to, and controlling the operation and various functions of circuitry outside the PLD. For example, controller 127 may constitute a memory controller that interfaces to and controls an external synchronous dynamic random access memory (SDRAM), as desired.

Figure 2:
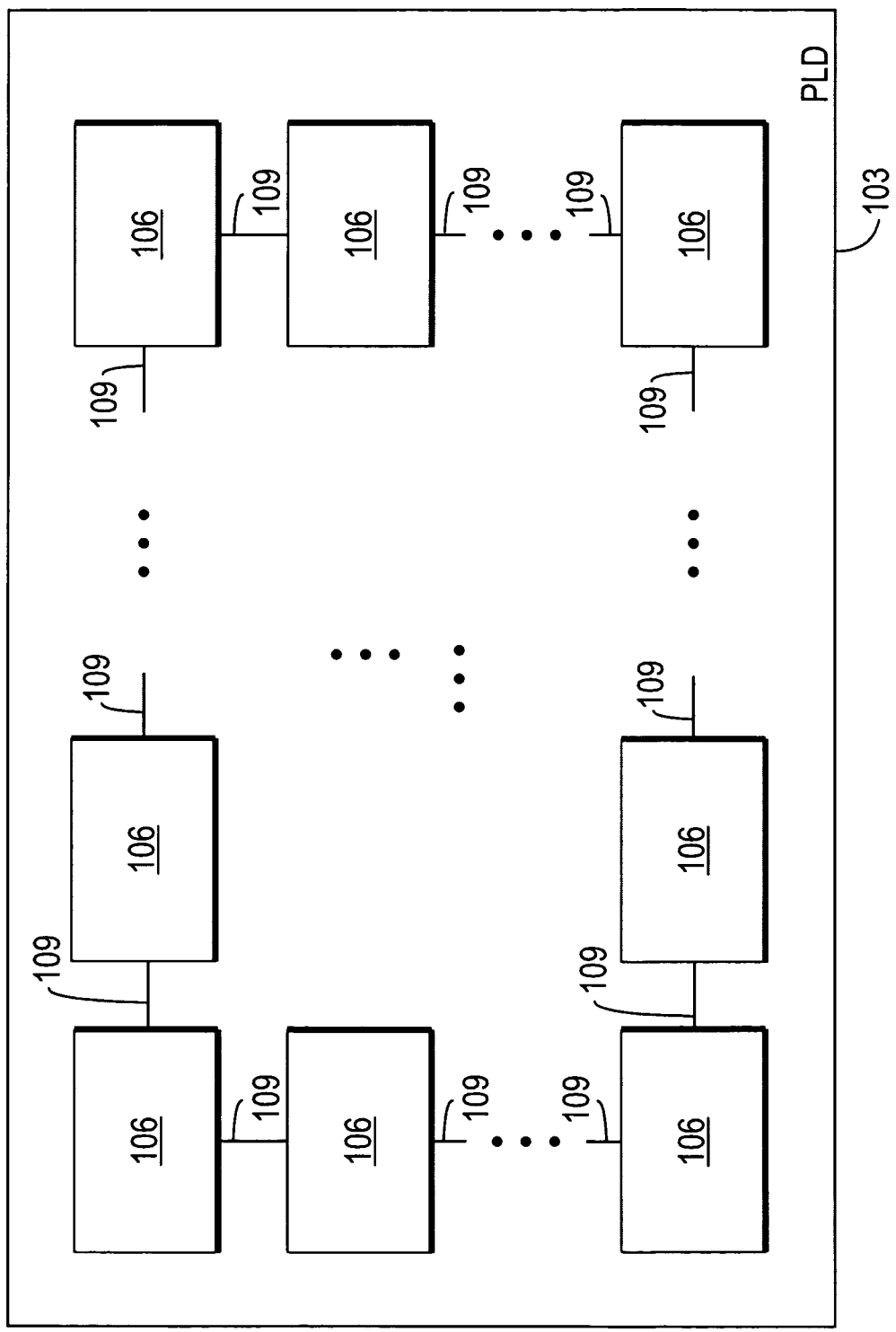
FIG. 2 depicts a floor-plan of a PLD that one may design or implement by using the disclosed concepts.

As noted, PLD 103 includes a number of blocks of programmable resources. Implementing a design using those resources often entails placement of those blocks (described below) within PLD 103's floorplan. FIG. 2 shows a floor-plan of a PLD that one may design or implement by using the disclosed concepts. A block, part of a block, or a set of blocks may constitute a tile or region of PLD 103.

PLD 103 includes programmable logic 106 arranged as a two-dimensional array. Programmable interconnect 109, arranged as horizontal interconnect and vertical interconnect, couples the blocks of programmable logic 106 to one another. One may place the blocks in a particular manner so as to implement a user's design, as persons of ordinary skill in the art who have the benefit of the disclosure in this document understand.

In illustrative embodiments, PLD 103 has a hierarchical architecture. In other words, each block of programmable logic 106 may in turn include smaller or more granular programmable logic blocks or circuits. For example, in one embodiment, programmable logic 106 may constitute blocks of configurable logic named logic array block (LAB), and each LAB may include logic elements (LEs) or other circuitry, as desired.

Persons of ordinary skill in the art who have the benefit of this disclosure understand, however, that a wide variety of other arrangements, with varying terminology and topology, are possible, and fall within the scope of the disclosed concepts. Furthermore, although FIG. 4 shows blocks of programmable logic 106, one may use PLDs with other or additional blocks (e.g., memory, processors, other blocks in FIG. 3, etc.) in their floorplans and take advantage of the disclosed concepts, as persons of ordinary skill in the art who have the benefit of this disclosure understand.

Regardless of the particular arrangement or design, however, one may use the disclosed concepts in CAD software or programs to exploit the PLD's resources and implement a desired circuit or system. Implementing a user's design in a PLD, such as PLD 103, entails a number of steps or processes, as detailed below.

Figure 3:
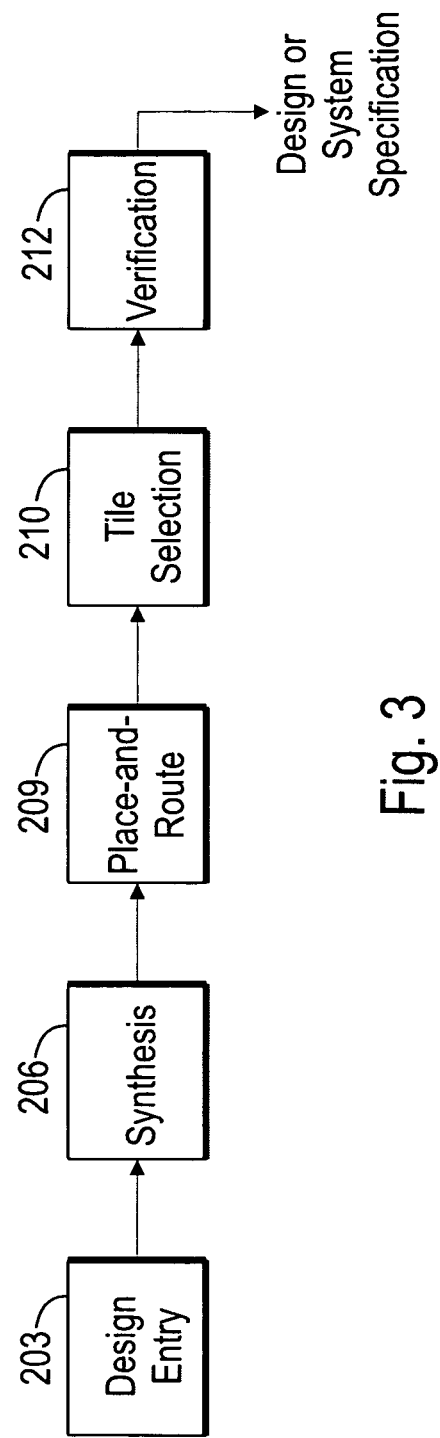
FIG. 3 shows various software modules that PLD CAD software according to illustrative embodiments uses.
Figure 4:
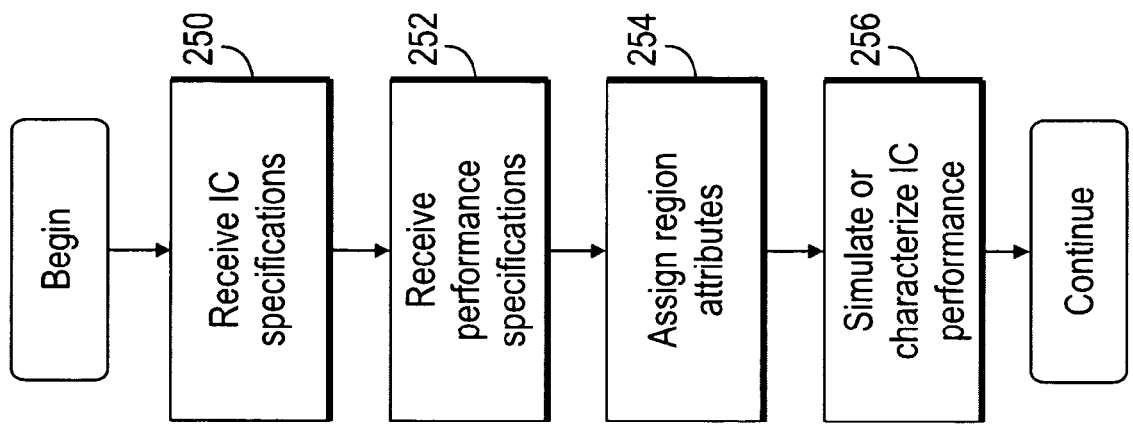
FIG. 4 illustrates a simplified flowchart for assignment of tiles/regions of an IC according to an exemplary embodiment.

FIG. 3 illustrates various software modules that PLD CAD software according to illustrative embodiments uses. The modules include design-entry module 203, synthesis module 206, place-and-route module 209, tile-selection module 210, and verification module 212. The following description provides a simplified explanation of the operation of each module.

The CAD techniques may have a variety of applications, as persons of ordinary skill in the art who have the benefit of this disclosure understand. Examples include design area, timing performance, power requirements, and routability, as desired.

Design-entry module 203 allows the editing of various design description files using graphical or textual descriptions of a circuit or its behavior, such as schematics, hardware description languages (HDL), or waveforms, as desired. The user may generate the design files by using design-entry module 203 or by using a variety of electronic design automation (EDA) or CAD tools (such as industry-standard EDA tools), as desired. The user may enter the design in a graphic format, a waveform-based format, a schematic format, in a text or binary format, or as a combination of those formats, as desired.

Synthesis module 206 accepts the output of design-entry module 203. Based on the user-provided design, synthesis module 206 generates appropriate logic circuitry that realizes the user-provided design. One or more PLDs (not shown explicitly), such as PLD 103 in FIG. 1, implement the synthesized overall design or system.

Synthesis module 206 may also generate any glue logic that allows integration and proper operation and interfacing of various modules in the user's designs. For example, synthesis module 206 provides appropriate hardware so that an output of one block properly interfaces with an input of another block. Synthesis module 206 may provide appropriate hardware so as to meet the specifications of each of the modules in the overall design or system.

Furthermore, synthesis module 206 may include algorithms and routines for optimizing the synthesized design. Through optimization, synthesis module 206 seeks to more efficiently use the resources of the one or more PLDs that implement the overall design or system. Synthesis module 206 provides its output to place-and-route module 209. Following synthesis, one may include a technology mapping module (not shown explicitly).

Place-and-route module 209 uses the designer's timing specifications to perform optimal logic mapping and placement. The logic mapping and placement determine the use of logic resources within the PLD(s). By the use of particular programmable interconnects with the PLD(s) for certain parts of the design, place-and-route module 209 helps optimize the performance of the overall design or system. By the proper use of PLD routing resources, place-and-route module 209 helps to meet the critical timing paths of the overall design or system.

Place-and-route module 209 optimizes the critical timing paths to help provide timing closure faster in a manner known to persons of ordinary skill in the art with the benefit of this disclosure. As a result, the overall design or system can achieve faster performance (i.e., operate at a higher clock rate or have higher throughput).

Tile or region selection module 210 configures various tiles in the IC. In other words, tile-selection module 210 assigns a tile or a group of tiles to operate in the low-power or high-speed modes of operation, as described below in detail.

Verification module 212 performs simulation and verification of the design. The simulation and verification seek in part to verify that the design complies with the user's prescribed specifications. The simulation and verification also aim at detecting and correcting any design problems before prototyping the design. Thus, verification module 212 helps the user to reduce the overall cost and time-to-market of the overall design or system.

Verification module 212 may support and perform a variety of verification and simulation options, as desired. The options may include functional verification, test-bench generation, static timing analysis, timing simulation, hardware/software simulation, in-system verification, board-level timing analysis, signal integrity analysis and electro-magnetic compatibility (EMC), formal netlist verification, and the like, as persons of ordinary skill in the art who have the benefit of the description of this disclosure understand.

Note that one may perform other or additional verification techniques as desired and as persons of ordinary skill in the art who have the benefit of this disclosure understand. Verification of the design may also be performed at other phases in the flow, as appropriate, and as desired.

As noted, the disclosed concepts may use a CAD flow, such as the CAD flow shown in FIG. 3. Generally speaking, one aspect of the disclosed concepts assign attributes to various tiles/regions of an IC that affect its power consumption and, hence, overall performance. FIG. 4 shows a simplified flowchart for configuration of tiles/regions of an IC according to an exemplary embodiment.

At 250, the IC's specifications are received. The specifications may include physical specifications, electronic specifications, and the like, as persons of ordinary skill in the art who have the benefit of the description of the disclosed concepts understand. At 252, performance specifications for the IC are received. The performance specifications may include timing specifications, power specifications, and the like, as persons of ordinary skill in the art who have the benefit of the description of the disclosed concepts understand.

At 254, attributes for various regions of the IC are assigned. More specifically, and generally speaking, one may assign a given region, or a group of regions, as high-speed or low-power, as desired. At 256, the effect of the assignment of the regions is evaluated. To do so, one may simulate or characterize (or use other suitable technique, as persons of ordinary skill in the art who have the benefit of the description of the disclosed concepts understand) the performance of the IC.

Some embodiments according to the disclosed concepts relate to methods and algorithms that may run after placement and routing (see FIG. 3 for CAD flow) to determine which regions should operate in high-speed or low-power mode. Before describing those techniques in detail, some modifications to synthesis, placement, and routing according to the disclosed concepts are described below.

In some embodiments, synthesis downsizes non-critical logic, increasing its delay but decreasing its area cost until it is near critical. To facilitate configuration of more logic to operate in the low-power mode, synthesis may be biased to favor solutions that have unbalanced path criticalities creating more opportunities for low-power operation. Note that even though doing so may result in solutions with more logic elements, it may result in lower power consumption if it results in less logic operating in the high-speed mode.

In some embodiments, the placement and routing engines use a delay model that corresponds to the high-speed mode of operation. Put another way, the assumption is that all the critical logic and routing will be configured to operate in high-speed mode. Hence, the high-speed mode of operation should be assumed during timing optimization for the best timing results.

Some placement and routing algorithms will terminate early or reduce effort when timing is met. That result can leave a lot of critical logic and routing that has to be configured to the high-speed mode of operation. To avoid this situation, a guardband can be applied to reflect the delay difference between high-speed and low-power modes of operation. That way, the placement and routing engines will get the margin necessary to enable more regions to operate in low-power mode. The margin can also be important for timing in compiles that have constraints on power (some regions may have to be left in low-power, even though they contain critical logic).

Figure 5:
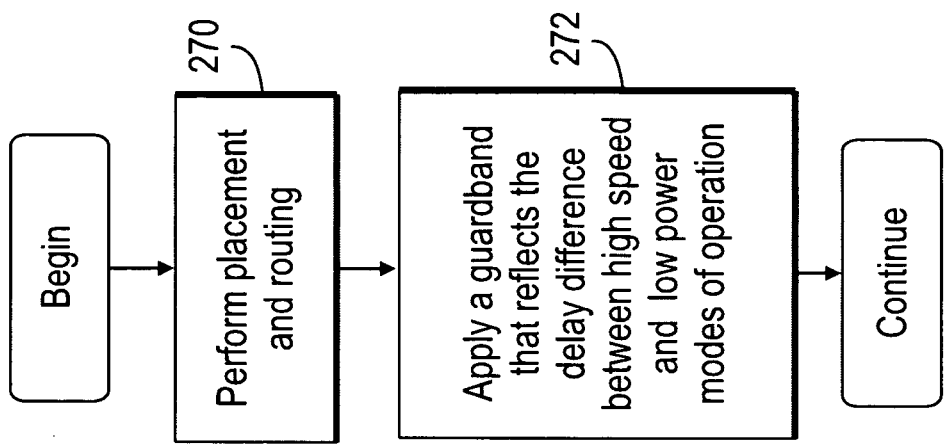
FIG. 5 depicts a simplified flowchart of a technique for applying guardband according to an exemplary embodiment.

FIG. 5 shows a simplified flowchart of a technique for applying guardband according to an exemplary embodiment. At 270, placement and routing is performed. After the placement and routing, or as part of placement and routing, at 272 a guardband is applied. The guardband reflects the delay difference between high-speed and low-power modes of operation, as described above.

Alternatively, a low-power mode delay model can be used to achieve similar results to a guardband. Because the relative delays of resources in this low-power model may not match those of the high-speed model, however, there may be some timing degradation with this approach. That said, using the low-power mode delay model does provide some power advantage by optimizing the placement and routing to meet timing assuming configuration (and relative delays) in low-power mode.

Figure 6:
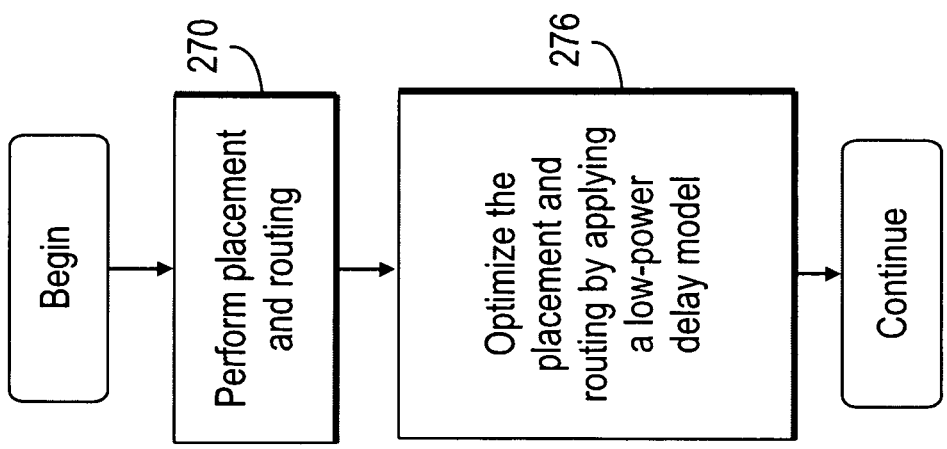
FIG. 6 illustrates a simplified flowchart of a technique for applying a low-power delay model according to an exemplary embodiment.

FIG. 6 shows a simplified flowchart of a technique for applying a low-power delay model according to an exemplary embodiment. At 270, placement and routing is performed. After the placement and routing, or as part of placement and routing, at 274 the placement and routing is optimized by applying a low-power delay model, as described above.

To further reduce the number of regions that need to be configured to high-speed mode, the placement and routing algorithm can be instructed to more aggressively optimize near-critical paths (the paths that are not highly timing critical, but have low margin). This can be done by increasing the relative weighting on the respective connections. For example, if the placement and/or routing algorithm uses connection criticalities (between 0 and 1, indicating the criticality of each connection), applying an exponent less than one to these criticalities, will increase the relative criticality of the near-critical paths.

Figure 7:
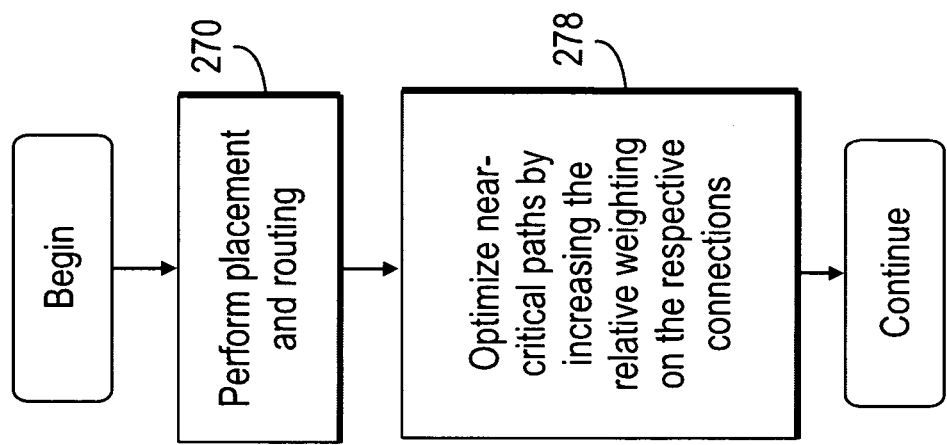
FIG. 7 shows a simplified flowchart of a technique for increasing the relative weighting according to an exemplary embodiment.

FIG. 7 shows a simplified flowchart of a technique for increasing the relative weighting according to an exemplary embodiment. At 270, placement and routing is performed. After the placement and routing, or as part of placement and routing, at 278 the near-critical paths are optimized by increasing the relative weighting of the respective connections, as described above.

To further reduce the number of regions that need to be configured to high-speed mode, the placement and routing algorithm can be modified to monitor the regions that are likely to be made high-speed.

In order to achieve this, it may be necessary to compute the probability that a given resource (or group of resources) will demand a region be set to high-speed (or use a region that is set to operate in the high-speed mode of operation). If the speed difference between high-speed and low-power resources is typically X %, and all the paths going through the given resource are more than X % off from critical value(s), the probability that it will demand high-speed operation is zero.

On the other hand, if a resource is on a critical path, the probability that it will demand high-speed operation is unity. All the probabilities in between can be computed (linearly) based on the criticality of the paths going through the resource. This is a relatively simple model of the probability that a resource will demand the high-speed mode of operation. One may use other models, as persons of ordinary skill in the art who have the benefit of the description of the disclosed concepts understand. For example, other models may also consider the delays of the resources, how many critical paths go through the resources, the probabilities for the high-speed mode of operation of other resources, and how the resources along the same path are distributed between high-speed low-power regions.

Figure 8A:
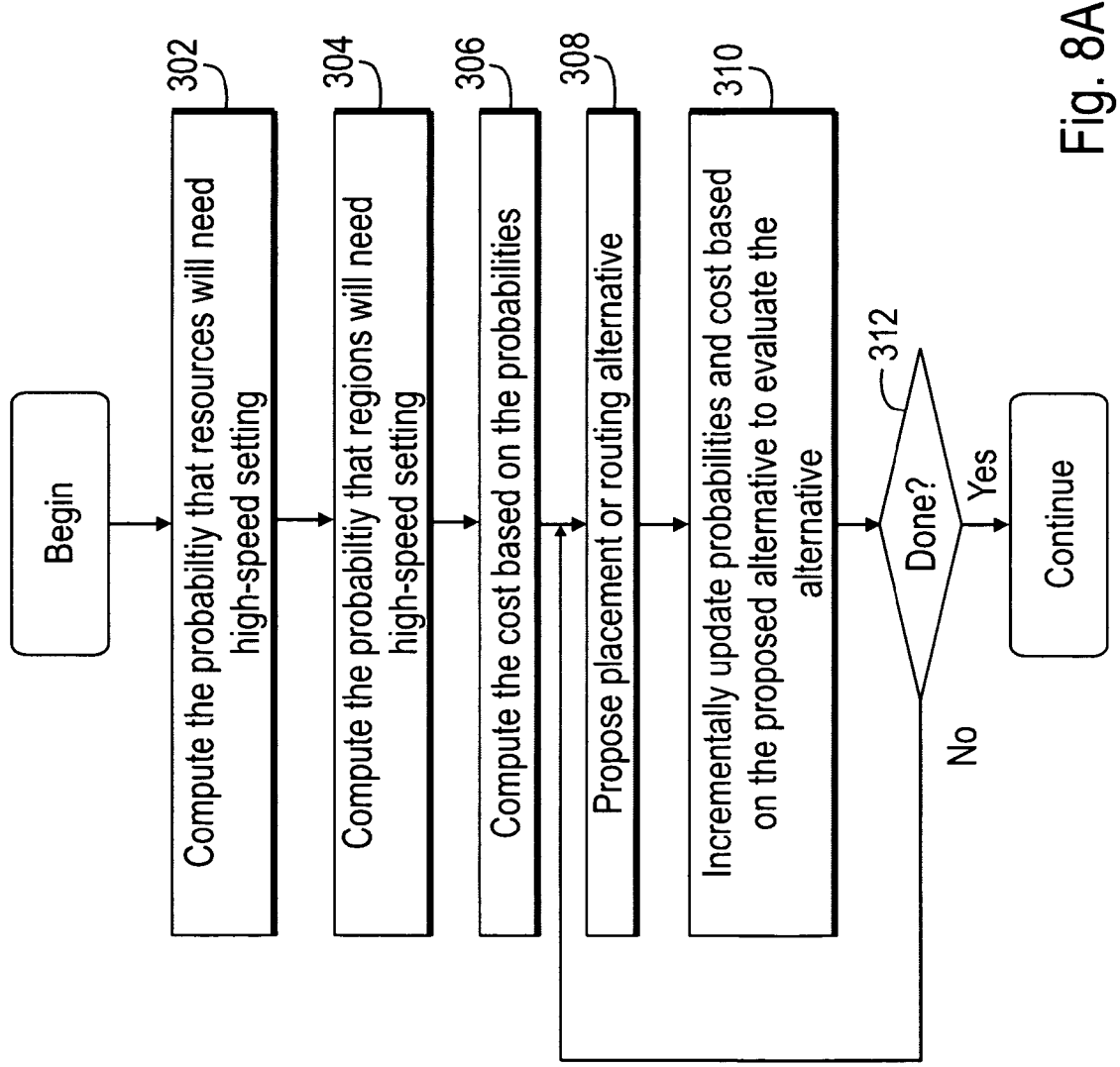
FIG. 8A illustrates a simplified flowchart according to an exemplary embodiment for optimizing the number of high-speed regions during placement and routing by monitoring the regions.

FIG. 8A shows a simplified flowchart according to an exemplary embodiment for optimizing the number of high-speed regions during placement and routing by monitoring the regions. At 302, the probability that a given set of resources will need the high-speed setting (i.e., the high-speed mode of operation) is computed. At 304, the probability that the corresponding regions will need the high-speed setting is computed.

Once the resource probabilities are computed, at 306 they can be used to compute the probability that a region will end up using the high-speed mode of operation. For example, the probability that a region will end up using the low-power mode of operation can be assumed to be equal to the product of the probabilities that all the resources in the region will be low-power. The probability that a region will be high-power is simply one minus the probability that the region will be low-power.

The above model is a relatively simple model of the probability that a region will demand high-speed mode. One may use other models, as desired, and as persons of ordinary skill in the art who have the benefit of the description of the disclosed concepts understand. For example, models may also consider the delays of the resources, how many critical paths go through the resources, the power benefit of low-power mode, the high-speed probabilities of other regions, and how the resources along the same path are distributed between high-speed low-power regions.

Given the region probabilities, at 306 a cost (or several costs) can be computed to penalize solutions (for example, placement solutions) that have a relatively large number of high-speed regions and/or a large expected power consumption. One may do so in a number of ways, as desired, as persons of ordinary skill in the art who have the benefit of the description of the disclosed concepts understand.

At 308, one or more placement or routing alternatives are proposed. At 310, the probabilities and the cost are incrementally updated based on the proposed alternative(s) in order to evaluate the proposed alternative(s). At 312, a check is made whether the operation has finished (e.g., no more proposed alternatives exist). If not, control returns to 308, and additional alternative(s) are proposed.

FIG. 8B shows a simplified flowchart according to another exemplary embodiment for optimizing the number of high-speed regions during placement and routing by monitoring the regions. At 302, the probability that a given set of resources will need the high-speed setting (i.e., the high-speed mode of operation) is computed. At 304, the probability that the corresponding regions will need the high-speed setting is computed.

Once the resource probabilities are computed, at 304 they can be used to compute the probability that a region will end up using the high-speed mode of operation, similar to the embodiment in FIG. 8A, described above. At 314, given the region probabilities, costs can be computed that would penalize changes that would increase the likelihood that a region would have to use the high-speed mode of operation. For example, a cost proportional to the probability that a region is a low-power region multiplied by the probability of a connection using the resource will demand the high-speed mode of operation can be used to discourage the router from selecting resources for a critical connection in regions that are likely to end up in the low-power mode. The cost may also include a component that considers the power change from the high-speed mode to the low-power mode. This component may be incorporated through simple multiplication.

At 316, the probability data are updated to reflect any change(s) made to the placement or routing. At 312, a check is made whether the operation has finished (e.g., no more proposed alternatives exist). If not, control returns to 308, and additional alternative(s) are proposed.

Figure 9:
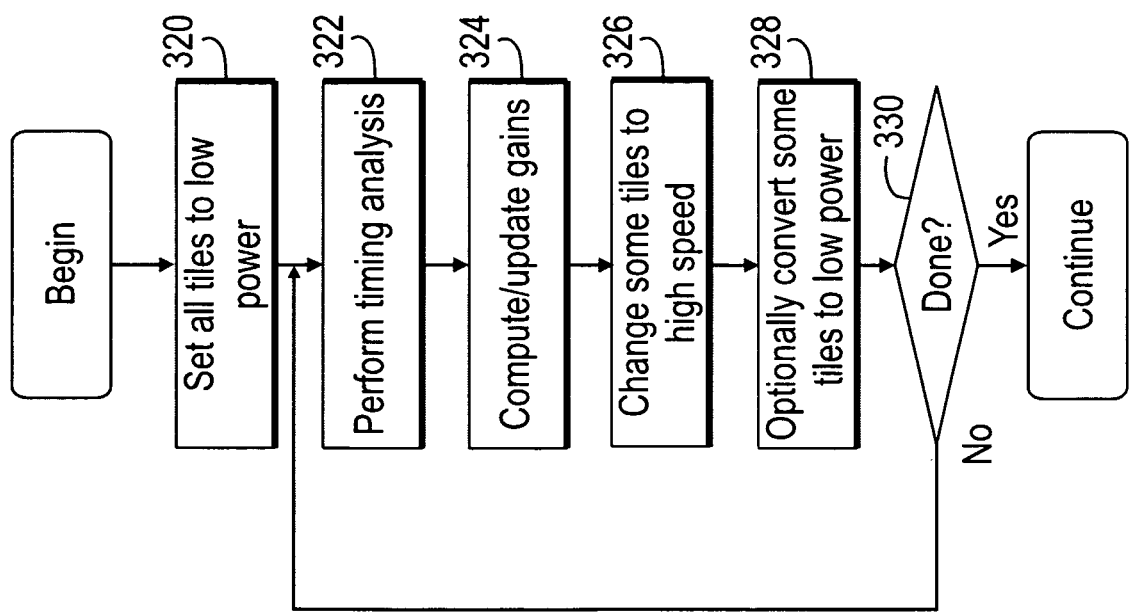
FIG. 9 depicts a simplified flowchart according to an exemplary embodiment for determining the mode of operation of one or more regions.

According to another aspect of the disclosed concepts, in exemplary embodiments, an algorithm or operation runs after placement and routing (see FIG. 3) that chooses which regions should operate in the high-speed or low-power modes of operation (i.e., tile or region selection). FIG. 9 depicts a simplified flowchart according to an exemplary embodiment for determines the mode of operation of one or more regions. At 320, all regions are set to the low-power mode of operation, except constrained regions that should operate in high-speed mode (in order to ensure proper operation and timing).

Next, a set of iterations are performed. During each iteration, the algorithm re-configures some tiles from the low-power mode to the high-speed mode. In each iteration, a long-path timing analysis (potentially with guardband to achieve a desired margin) is performed at 322, using delays based on the current regions' high-speed or low-power mode settings.

All low-power regions with failing paths are considered as candidates for high-speed mode re-configuration. To help determine which regions should be re-configured, a gain score is assigned to each region. Thus, at 324, gain scores are computed or updated for each region.

The gain score of a region can be a function of the negative slack improvement that results from re-configuring the respective region in isolation. This negative slack improvement can be estimated on a per-resource basis by considering a quantity A, where:

$$A=\min((\text{low-power mode delay})-(\text{high-speed mode delay}),\max(0,-(\text{slack through resource}))).$$

Put another way, the negative slack through a resource cannot be improved by more than the magnitude of the negative slack and the change in the resource delay. The negative slack improvement of the tile can be estimated as the sum of the respective resource negative slack improvements of the tile.

One may use better estimates of negative slack improvement of a tile by considering a combination of resources, and how the total delay change affects the negative slack of each relevant path. A relatively quick estimate of the effect a resource will have on multiple paths can be computed by multiplying the quantity A (see above) and the failing path count through the resource. The failing path count for each timing edge (resource) can be estimated/computed by using a standard path-counting algorithm or technique, but applying it to merely the portion of the timing graph with negative slack edges.

Once the negative slack improvement of a region is computed, it can be normalized. To do so, one divides the negative slack by the magnitude of the power impact of changing the region to high-speed mode to compute the final gain score.

Figure 10:
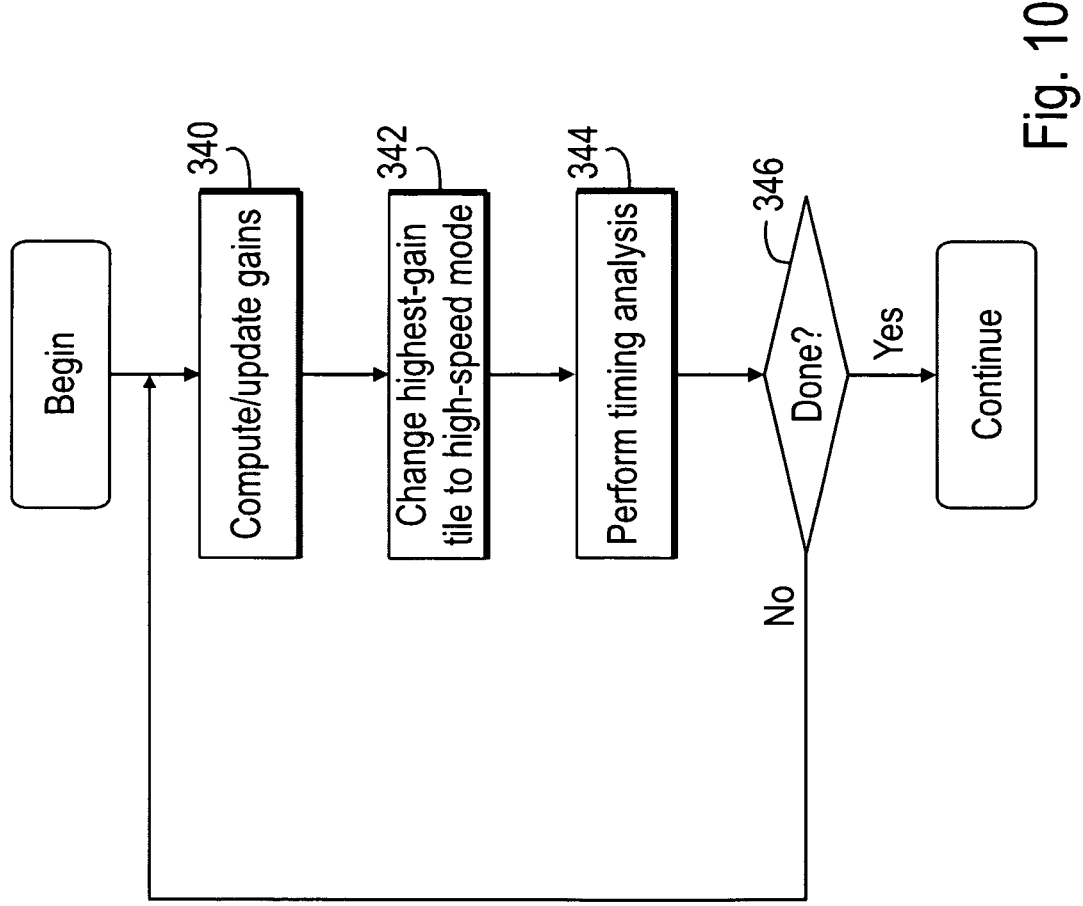
FIG. 10 shows a simplified flowchart according to an exemplary embodiment for selecting a region for mode conversion.

At 326, some tiles or regions are changed to the high-speed mode of operation. As a refinement, one may select the region with the highest gain score as the best candidate to switch to high-speed mode. FIG. 10 shows a simplified flowchart according to an exemplary embodiment for selecting a region for mode conversion according to this refinement. At 340, gains of various regions are computed/updated. For the most conservative style of optimization (i.e., minimum number of high-speed tiles), the highest gain score region is re-configured. At 342, the region with the highest gain score is converted to the high-speed mode of operation. At 344, a timing analysis (e.g., an incremental timing analysis) can then be performed to propagate (figure out) the effect on timing of the change in the region's mode of operation.

The gain of all the regions that contain resources that are affected by these timing changes can be re-computed. Note that to make the operations fast and incremental, data caching may be used. For example, one may cache the timing edges related to each region. Similarly, one may cache the regions related to each timing edge. After re-computing the gains, the region with the highest gain score can then be processed, and so on, until no more low-power mode regions have failing timing paths.

Referring to FIG. 9, at 328, one may optionally convert (described in more detail below) some tiles back to the low-power mode of operation. One may then perform a timing analysis to evaluate the change. At 330, a check is made to determine whether the operation has finished (e.g., no more changes remain). If not, control passes to 322, and the iterations continue.

As an alternative to timing analyzing after each region is converted, one may use the approach of marking all the regions that have "tainted" or stale gain scores because their gains can be affected by region re-configurations elsewhere in the design. This "tainting" can be efficiently achieved by doing local traversals starting with the timing edges relevant to a converted region.

Figure 11:
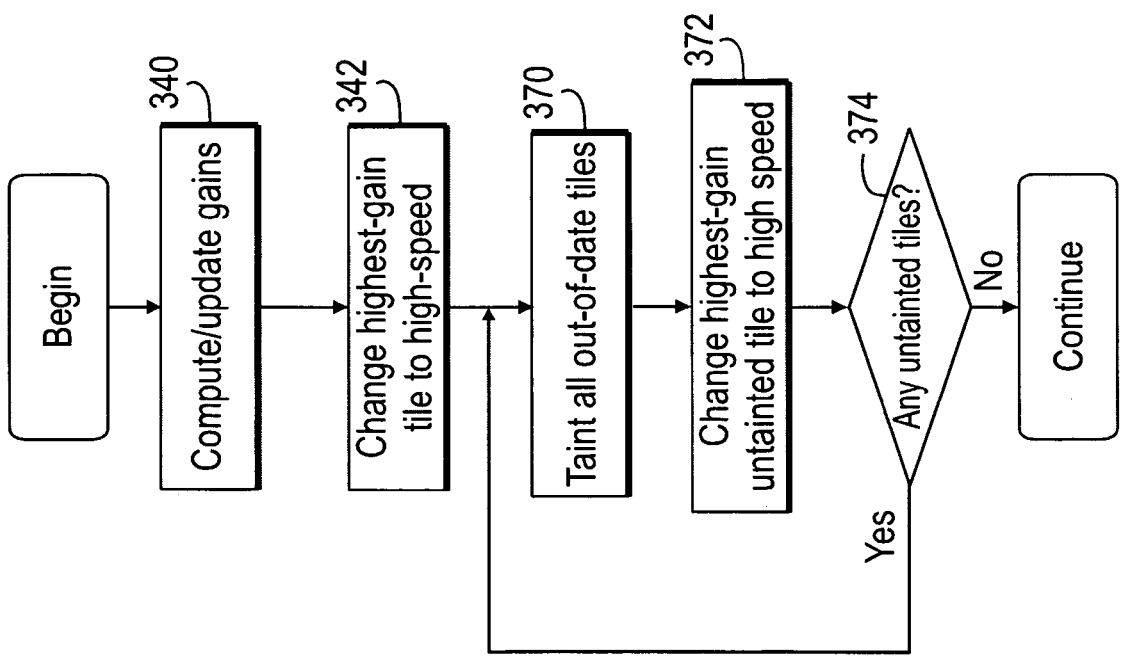
FIG. 11 illustrates a simplified flowchart according to an exemplary embodiment that uses a tainting technique.

FIG. 11 shows a simplified flowchart according to an exemplary embodiment that uses the tainting technique. Similar to FIG. 10, described above, at 340 gains of various regions are computed/updated. At 342, the region with the highest gain score is converted to the high-speed mode of operation.

After every region is converted, at 370 the "tainting" process can be executed. The next highest-gain score "untainted" or unstale region can be then converted at 372. This process can then be repeated (at 374) until there are no more "untainted" or unstale regions, in which case, a timing analysis can be performed, then all the "tainting" or staleness can be removed, and the overall process repeated.

Note that during the "tainting," one should expand the "taint" or staleness from "tainted" or stale regions as well, in addition to the converted regions, because removing a region as a candidate for conversion, means that the timing paths through this region can be in a different high-speed/low-power mode than optimal. That is, a "tainted" or stale region may need to be converted to achieve an optimal solution, so other regions should not be processed if they are dependent on this region, until this region gets an opportunity to be processed.

A less conservative style of optimization can be used to save runtime. Instead of just converting the highest gain "untainted" or unstale regions between timing analyses, an embodiment of the method can ensure that N regions are converted between timing analyses. If there are not enough "untainted" or unstale regions to achieve this, "tainted" or stale regions with the highest gain can be considered. The value of N can be based on the number of iterations being performed and the number of regions with gains (being considered for conversion). That is, if there are I iterations left to be performed (including the current one), and there are C candidate regions, N can be set to C/I. Given that C will likely decrease by more than N per iteration (failing paths beginning to pass timing), N can be set lower than this value in earlier iterations to reduce the number of regions "inappropriately" converted.

Referring to 328 in FIG. 9, one option if regions are converted from lower power to high speed where they should not have been converted (or have been converted unnecessarily) is to have a post-processing step that converts high-speed regions back to low-power regions (see 328 in FIG. 9). This step can also be interleaved with the low-power to high-speed conversion iterations, so that the algorithm does not gradually increase the number of high-speed regions, but oscillates until an improved or good final solution is obtained.

One consideration when converting from high-speed to low-power (which motivates the opposite direction of conversion in the original embodiment) is that it is relatively expensive (not trivial) to perfectly predict whether the conversion of the tile will cause a timing degradation. The effect of this type of imprecision on the original embodiment is to convert more tiles to high-speed, which affects power.

In practice, timing constraints are "harder" than power constraints, and the impact on power is generally relatively small, so the embodiment in FIG. 9 primarily converts from low-power to high-speed. To avoid this imprecision, one may perform an incremental timing analysis anticipating a region change from high-speed to low-power, or do the change, perform an incremental analysis, and undo the change if it proves detrimental to the timing.

Alternatively, the change can be made and, if timing is degraded, iterations of low-power to high-speed can be invoked to remedy the situation. Also note that high-speed to low-power and low-power to high-speed re-configurations may be combined in a single iteration, as desired. These approaches can be relatively expensive (in terms of time or computing resources) but, if they are used judiciously, the expense may be manageable and may end up reducing the number of high-speed regions and/or power.

Note that similar techniques to those described above can be used to compute gain scores for regions when converting from high-speed to low-power. Generally, the gain (or cost) function should discourage tiles from being changed if they have low slack, large high-speed to low-power delay differentials or differences, a relative large number of failing or close-to-failing paths, and/or small power savings from a change of mode (i.e., a relatively small difference between the power consumption of the tile in the low-power and high-speed modes of operation).

Most timing analyzers annotate slacks on data-path connections. Clock paths also affect timing. Therefore, various embodiments may reconfigure to the high-speed mode of operation some regions that contain clock paths in order to satisfy design timing constraints. To achieve this goal, some embodiments may take the long-path data path slacks at the output of storage elements, and propagate those slacks backward along the corresponding clock paths that feed the storage elements.

This slack propagation involves setting a clock-edge slack to the minimum of its current slack and the slack being propagated. That way, the relevant clock paths receive the appropriate or necessary slacks to guide optimization, as described above.

Alternatively, the timing analysis can analyze paths starting at clock sources, through source storage elements, to the destination storage elements. That way, slacks will be calculated for source clock paths in addition to data paths. To compute slacks for the clock paths to the destination storage elements, a desired, specified, or required traversal can be performed from the destination register to the clock sources, assuming that the destination has a minimum required, specified, or desired time equal to the arrival time at the destination register.

Note that for a long-path constraint, the slacks computed for the clock path to the destination register will be short-path slacks. Long-path optimization benefits from a longer clock delay to the destination register.

Similar techniques can be used to handle short-path constraints, as desired. For example, short-path data path slacks at the input of storage elements can be propagated (as long-path slacks) backward along the corresponding clock paths that feed the storage elements.

Alternatively, for short-path constraints, to compute long-path slacks for the clock paths to the destination storage elements, a required or desired traversal can be performed from the destination register to the clock sources assuming that the destination has a maximum required, desired, or specified time equal to the arrival time at the destination register.

It can also be desirable or important that exemplary embodiments according to the disclosed concepts tolerate impossible or unachievable timing constraints gracefully. That is, the user sometimes sets timing constraints that are impossible to meet in order to get the best possible timing results. It would be undesirable if all the used regions were set to high-speed mode because, in reality, the clock can run as fast as the most critical path. So, as long as the most critical path uses resources in regions that are all high-speed, there is no real need to speed up other paths.

To achieve this goal, slack shifting can be beneficial. That is, slacks, on a per-timing-domain basis, can be shifted, so that, at most, paths within X % of critical have slacks less than or equal to zero. Doing so limits the candidates for high-speed mode to those paths that are near critical (within X %).

To achieve the minimum number of high-speed regions, X can be set close to zero. Larger values of X can be used to compensate for delay modeling errors. That is, if the delay model can be inaccurate by up to, say, 5%, to achieve the best timing results, X should be set to five to ensure that a path within 5% of the delay of the critical path uses all high-speed resources, because it could, in fact, be critical. In other embodiments, the timing achieved with all tiles set to high-speed can be extracted and re-applied as timing constraints (perhaps with extra margin) to guide high-speed low-power region optimization to a solution that achieves maximum performance without increasing power appreciably or to a relatively large extent.

To support constraints on the number of high-speed regions allowed, or on the maximum power, various embodiments according to the disclosed concepts may restrict the regions converted. This restriction can be achieved by limiting, in each iteration, the number of candidate regions to the appropriately-sized subset with the highest gains.

Slack shifting can be beneficial in these instances because, if all timing failures cannot be fixed, it is generally beneficial to fix or correct the most serious timing failures (the most critical paths). Recall that, as discussed above, slack shifting adjusts slacks until paths that are within X % of critical have slacks less than or equal to zero. For a given value of X, a certain number of candidate regions will be identified based on which timing failures remain. By reducing the value of X, the number of candidate regions can be reduced to better meet the restrictions on how many more high-speed regions are allowed, and/or how much more power increase can be tolerated. Thus, some embodiments will try to reduce the value of X to ensure that the subset of regions with the highest gains that are chosen as candidates will contain the most critical paths in the design.

It should be noted that even though two modes of operation (low-power and high-speed) are discussed, these techniques can be easily extended to support multiple modes of operation. To achieve multiple modes of operation, the same placement and routing techniques discussed above can be applied by simply assuming that just the highest speed and lowest power modes are available. That way, the placement and routing will be optimized to minimize the number of high-speed regions and maximize the number of low power regions in a coarse-grained fashion. The fine tuning can be left to the high-speed low-power optimization algorithm.

In the high-speed low-power optimization algorithm, instead of just switching directly from low-power to high-speed modes, the regions could be re-configured to their adjacent settings (adjacent modes of operation). For example, if the current setting of a region is low-power, and the algorithm seeks to increase the speed of the region, it can change the region from low-power to medium-speed in one iteration.

In another iteration, it can change the region from medium-speed to high-speed, if necessary or desired. The gains may be computed based on the better or more advantageous of the changes, e.g., changing from low-power to medium-speed and low-power to high-speed. That way, the gains reflect the fact that the medium-speed setting may be temporary.

Alternatively, separate gains can be computed for all the region re-configuration options. For example, a separate gain can be computed for going from low-power to medium-speed, and a separate gain can be computed for going from low-power to high-speed. The better or more advantageous of the two re-configurations can be seamlessly picked as region selection is performed using gains.

As noted above, although the above description concerns in parts the application of the disclosed concepts to PLDs, one may apply the disclosed concepts to a variety of other electronic circuits and devices, by making modifications that fall within the knowledge of persons of ordinary skill in the art who have the benefit of the description of the disclosed concepts. Some examples of such devices include custom, standard-cell, gate-array, field-programmable gate arrays (FPGAs), and structured application specific integrated circuit (ASIC) implementations.

Figure 12:
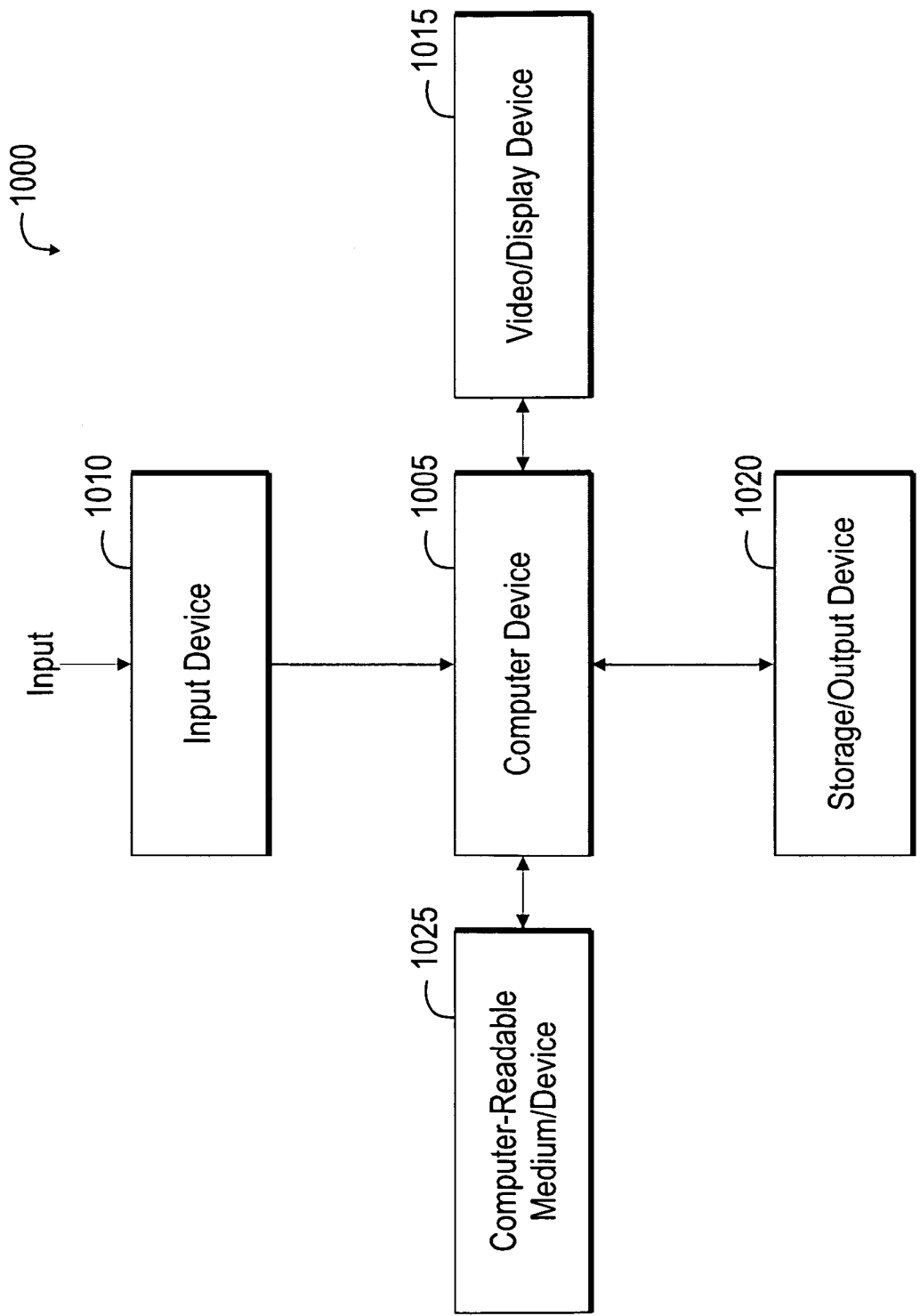
FIG. 12 shows a block diagram of an exemplary system for processing information according to the disclosed concepts.

One may run or execute the disclosed algorithms, methods, or software on computer systems or processors. FIG. 12 shows a block diagram of an exemplary system for processing information according to the disclosed concepts. Persons of ordinary skill in the art who have the benefit of the disclosure understand that one may use a wide variety of other computer systems, processors, microcomputers, workstations, and the like, as desired.

System 1000 includes a computer device 1005, an input device 1010, a video/display device 1015, and a storage/output device 1020, although one may include more than one of each of those devices, as desired.

Computer device 1005 couples to input device 1010, video/display device 1015, and storage/output device 1020. System 1000 may include more that one computer device 1005, for example, a set of associated computer devices or systems, as desired, and as persons of ordinary skill in the art who have the benefit of the description of the disclosed concepts understand.

System 1000 operates in association with input from a user. The user input typically causes system 1000 to perform specific desired information-processing tasks, including circuit simulation. System 1000 in part uses computer device 1005 to perform those tasks. Computer device 1005 includes an information-processing circuitry, such as a central-processing unit (CPU), although one may use more than one CPU or information-processing circuitry, as persons skilled in the art would understand.

Input device 1010 receives input from the user and makes that input available to computer device 1005 for processing. The user input may include data, instructions, or both, as desired. Input device 1010 may constitute an alphanumeric input device (e.g., a keyboard), a pointing device (e.g., a mouse, roller-ball, light pen, touch-sensitive apparatus, for example, a touch-sensitive display, or tablet), or both. The user operates the alphanumeric keyboard to provide text, such as ASCII characters, to computer device 1005. Similarly, the user operates the pointing device to provide cursor position or control information to computer device 1005.

Video/display device 1015 displays visual images to the user. The visual images may include information about the operation of computer device 1005, such as graphs, pictures, images, and text. The video/display device may constitute a computer monitor or display, a projection device, and the like, as persons of ordinary skill in the art would understand. If a system uses a touch-sensitive display, the display may also operate to provide user input to computer device 1005.

Storage/output device 1020 allows computer device 1005 to store information for additional processing or later retrieval (e.g., softcopy), to present information in various forms (e.g., hardcopy), or both. As an example, storage/output device 1020 may constitute a magnetic, optical, or magneto-optical drive capable of storing information on a desired medium and in a desired format. As another example, storage/output device 1020 may constitute a printer, plotter, or other output device to generate printed or plotted expressions of the information from the computer device 1005.

Computer-readable medium 1025 interrelates structurally and functionally to computer device 1005. Computer-readable medium 1025 stores, encodes, records, and/or embodies functional descriptive material. By way of illustration, the functional descriptive material may include computer programs, computer code, computer applications, and/or information structures (e.g., data structures or file systems). When stored, encoded, recorded, and/or embodied by computer-readable medium 1025, the functional descriptive material imparts functionality. The functional descriptive material interrelates to computer-readable medium 1025.

Information structures within the functional descriptive material define structural and functional interrelations between the information structures and computer-readable medium 1025 and/or other aspects of system 1000. These interrelations permit the realization of the information structures' functionality. Moreover, within such functional descriptive material, computer programs define structural and functional interrelations between the computer programs and computer-readable medium 1025 and other aspects of system 1000. These interrelations permit the realization of the computer programs' functionality.

By way of illustration, computer device 1005 reads, accesses, or copies functional descriptive material into a computer memory (not shown explicitly in the figure) of computer device 1005. Computer device 1005 performs operations in response to the material present in the computer memory. Computer device 1005 may perform the operations of processing a computer application that causes computer device 1005 to perform additional operations. Accordingly, the functional descriptive material exhibits a functional interrelation with the way computer device 1005 executes processes and performs operations.

Furthermore, computer-readable medium 1025 constitutes an apparatus from which computer device 1005 may access computer information, programs, code, and/or applications. Computer device 1005 may process the information, programs, code, and/or applications that cause computer device 1005 to perform additional operations.

Note that one may implement computer-readable medium 1025 in a variety of ways, as persons of ordinary skill in the art would understand. For example, memory within computer device 1005 may constitute a computer-readable medium 1025, as desired. Alternatively, computer-readable medium 1025 may include a set of associated, interrelated, coupled (e.g., through conductors, fibers, etc.), or networked computer-readable media, for example, when computer device 1005 receives the functional descriptive material from a network of computer devices or information-processing systems. Note that computer device 1005 may receive the functional descriptive material from computer-readable medium 1025, the network, or both, as desired.

Referring to the figures, persons of ordinary skill in the art will note that the various blocks shown may depict mainly the conceptual functions and signal flow. The actual circuit implementation may or may not contain separately identifiable hardware for the various functional blocks and may or may not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation, as persons of ordinary skill in the art who have the benefit of the disclosure in this document understand. Other modifications and alternative embodiments of the disclosed concepts in addition to those described here will be apparent to persons of ordinary skill in the art who have the benefit of the description of the disclosure. Accordingly, this description teaches those skilled in the art the manner of carrying out the disclosed concepts and are to be construed as illustrative only.

The forms of the disclosed concepts and embodiments shown and described should be taken as the presently preferred or illustrative embodiments. Persons skilled in the art may make various changes in the shape, size and arrangement of parts without departing from the scope of the disclosure in this document. For example, persons skilled in the art may substitute equivalent elements for the elements illustrated and described here. Moreover, persons skilled in the art who have the benefit of this disclosure may use certain features of the disclosed concepts independently of the use of other features, without departing from the scope of the disclosure.

The invention claimed is:

1. A system for computer-aided design (CAD) of an integrated circuit (IC) to implement a user's design by using resources of the integrated circuit (IC), the system comprising a computer, configured to optimize synthesis, placement, and/or routing of the integrated circuit (IC) by maximizing a number of low-power regions in the integrated circuit (IC), wherein the computer is further configured to minimize a number of high-speed regions in the integrated circuit (IC) by monitoring a set of regions in the integrated circuit (IC) that are to be made high-speed regions by computing a first probability that a region in the set of regions will use the high-speed mode of operation.

2. The system according to claim 1, wherein the computer is further configured to monitor the set of regions in the integrated circuit (IC) that are to be made high-speed regions by computing a second probability that a connection in the integrated circuit (IC) will use a region that operates in the high-speed mode of operation.

3. The system according to claim 2, wherein the computer is further configured to compute a cost based on the first and second probabilities.

4. The system according to claim 1, wherein the computer is further configured to compute a cost based on the first probability.

5. The system according to claim 4, wherein the computer is further configured to incrementally update the first probability and the cost.

6. The system according to claim 1, wherein the computer is further configured to propose a placement/routing alternative.

7. A computer-implemented method for implementing a user's design using resources of integrated circuit (IC), the method comprising optimizing, using the computer, synthesis, placement, and/or routing of the integrated circuit (IC) by maximizing a number of low-power regions in the integrated circuit (IC), wherein the computer minimizes a number of high-speed regions in the integrated circuit (IC) by monitoring a set of regions in the integrated circuit (IC) that are to be made high-speed regions by computing a first probability that a region in the set of regions will use the high-speed mode of operation.

8. The method according to claim 7, further comprising using the computer to monitor the set of regions in the integrated circuit (IC) that are to be made high-speed regions by computing a second probability that a connection in the integrated circuit (IC) will use a region that operates in the high-speed mode of operation.

9. The method according to claim 8, further comprising using the computer to compute a cost based on the first and second probabilities.

10. The method according to claim 7, further comprising using the computer to compute a cost based on the first probability.

11. The method according to claim 10, further comprising using the computer to incrementally update the first probability and the cost.

12. The method according to claim 7, wherein the computer proposes a placement/routing alternative.

* * * * *